United States Patent
Moscinski et al.

(10) Patent No.: US 8,707,674 B2
(45) Date of Patent: Apr. 29, 2014

(54) PULSE DETONATION TUBE WITH LOCAL FLEXURAL WAVE MODIFYING FEATURE

(75) Inventors: Michael Moscinski, Glenville, NY (US); Adam Rasheed, Glenville, NY (US); Brian Gene Brzek, Clifton Park, NY (US); Narendra Digamber Joshi, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 779 days.

(21) Appl. No.: 12/895,368

(22) Filed: Sep. 30, 2010

(65) Prior Publication Data

US 2012/0079806 A1    Apr. 5, 2012

(51) Int. Cl.
F02C 5/02    (2006.01)
F02K 5/02    (2006.01)
F02C 5/00    (2006.01)

(52) U.S. Cl.
USPC ............................ 60/39.38; 60/39.76; 60/247

(58) Field of Classification Search
USPC ............... 60/39.38, 39.76, 39.77, 247; 431/1
See application file for complete search history.

(56) References Cited

U.S. PATENT DOCUMENTS

| | | | | |
|---|---|---|---|---|
| 866,330 | A * | 9/1907 | Calkins | 60/221 |
| 1,035,454 | A * | 8/1912 | Lewis | 60/247 |
| 1,856,552 | A * | 5/1932 | Hadamik et al. | 60/247 |
| 1,980,266 | A * | 11/1934 | Goddard | 60/247 |
| 2,523,379 | A * | 9/1950 | Kollsman | 60/247 |
| 2,601,471 | A * | 6/1952 | Vang | 60/247 |
| 2,677,232 | A * | 5/1954 | Collins | 60/244 |
| 2,799,136 | A * | 7/1957 | De Boisblanc | 60/39.091 |
| 2,834,181 | A * | 5/1958 | Paris et al. | 60/225 |
| 2,860,484 | A * | 11/1958 | Schmidt | 60/39.77 |
| 3,188,805 | A * | 6/1965 | Gahagan | 60/247 |
| 3,210,930 | A * | 10/1965 | Leeper et al. | 60/247 |
| 3,264,824 | A * | 8/1966 | Bost | 60/39.78 |
| 3,293,852 | A * | 12/1966 | Galli et al. | 60/202 |
| 3,449,913 | A * | 6/1969 | Grebe | 60/204 |
| 6,584,765 | B1 * | 7/2003 | Tew et al. | 60/249 |
| 7,669,405 | B2 * | 3/2010 | Pinard et al. | 60/247 |
| 7,828,546 | B2 * | 11/2010 | Wiedenhoefer et al. | 431/346 |
| 7,966,803 | B2 * | 6/2011 | Chapin et al. | 60/39.76 |
| 2002/0059793 | A1 * | 5/2002 | Kaemming et al. | 60/204 |
| 2003/0182927 | A1 * | 10/2003 | Leyva | 60/247 |
| 2004/0000134 | A1 * | 1/2004 | Tew et al. | 60/247 |
| 2004/0237504 | A1 * | 12/2004 | Pinard et al. | 60/247 |
| 2005/0120700 | A1 * | 6/2005 | Tangirala et al. | 60/39.76 |
| 2005/0279083 | A1 * | 12/2005 | McManus et al. | 60/247 |
| 2006/0254252 | A1 * | 11/2006 | Rasheed et al. | 60/39.38 |
| 2007/0015099 | A1 * | 1/2007 | Wiedenhoefer et al. | 431/346 |
| 2007/0144179 | A1 * | 6/2007 | Pinard et al. | 60/776 |
| 2008/0209884 | A1 * | 9/2008 | Denne | 60/247 |
| 2009/0320439 | A1 * | 12/2009 | Chapin et al. | 60/39.38 |
| 2011/0302904 | A1 * | 12/2011 | Zhang et al. | 60/39.38 |
| 2012/0047873 | A1 * | 3/2012 | Gutmark et al. | 60/247 |
| 2012/0192545 | A1 * | 8/2012 | Tangirala et al. | 60/247 |

OTHER PUBLICATIONS

Chao et al., "One the Design of Pulse Detonation Engines," GALCIT Report FM 00-7, Jan. 15, 2001.

* cited by examiner

Primary Examiner — Gerald L Sung
(74) Attorney, Agent, or Firm — Scott J. Asmus (57) ABSTRACT

In one embodiment, a pulse detonation tube includes a continuous base tube having a substantially uniform wall thickness. The pulse detonation tube also includes a local flexural wave modifying feature configured to locally vary a flexural wave speed such that the flexural wave speed through the pulse detonation tube is different than an expected detonation wave speed, and/or to locally dissipate flexural wave energy.

8 Claims, 5 Drawing Sheets

PULSE DETONATION TUBE WITH LOCAL FLEXURAL WAVE MODIFYING FEATURE

BACKGROUND OF THE INVENTION

The subject matter disclosed herein relates generally to a pulse detonation tube and, more specifically, to enhancing the durability of the pulse detonation tube by employing a local flexural wave modifying feature.

Pulse detonation combustion can be utilized in various practical engine applications. An example of such an application is the development of a pulse detonation engine (PDE) where hot detonation products are directed through an exit nozzle to generate thrust for aerospace propulsion. Pulse detonation engines that include multiple combustor chambers are sometimes referred to as a "multi-tube" configuration for a pulse detonation engine. Another example is the development of a "hybrid" engine that uses both conventional gas turbine engine technology and pulse detonation (PD) technology to enhance operational efficiency. Such pulse detonation turbine engines (PDTE) can be used for aircraft propulsion or as a means to generate power in ground-based power generation systems.

Within a pulse detonation tube, the combustion reaction is a detonation wave that moves at supersonic speed, thereby increasing the efficiency of the combustion process as compared to subsonic deflagration combustion. Specifically, air and fuel are typically injected into the pulse detonation tube in discrete pulses. The fuel-air mixture is then detonated by an ignition source, thereby establishing a detonation wave that propagates downstream through the tube at a supersonic velocity. In addition, a weaker shock wave may propagate upstream toward the combustor inlet. The detonation process produces pressurized exhaust gas within the pulse detonation tube that may be used to produce thrust or be converted to work in a turbine.

As will be appreciated, material properties and geometry of the pulse detonation tube at least partially define a speed at which mechanical waves travel through the structure of the tube. This speed may be known as the flexural wave speed and may include a breathing mode component and a dilatation component. As the detonation wave travels through the tube, the sharp pressure rise associated with the detonation wave front generates a mechanical wave at each discrete location along the length of the tube. These mechanical waves propagate through the tube structure at the flexural wave speed. If the speed of the detonation wave is substantially similar to the flexural wave speed of the tube, the detonation wave will excite the pulse detonation tube at resonance. Consequently, the strain resulting from the detonation wave will be significantly greater than the strain associated with static pressure loading at the detonation wave pressure. Such strain amplification may increase along the length of the tube due to the additive effect of multiple coalescing flexural waves. For example, in certain tube configurations, the strain may be amplified by a factor of 2, 3, 4, 5, 6, or more compared to static pressure loading. As a result, the longevity of the pulse detonation tube may be significantly reduced.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a pulse detonation tube includes a continuous base tube having a substantially uniform wall thickness. The pulse detonation tube also includes a local flexural wave modifying feature configured to locally vary a flexural wave speed such that the flexural wave speed through the pulse detonation tube is different than an expected detonation wave speed, and/or to locally dissipate flexural wave energy.

In another embodiment, a pulse detonation tube includes a continuous base tube having a substantially uniform wall thickness. The pulse detonation tube also includes an air valve disposed at an upstream end of the pulse detonation tube and configured to emanate an air pulse in a downstream direction. The pulse detonation tube further includes a fuel injector configured to inject fuel into each air pulse to establish a mixed fuel-air region, and an ignition source disposed downstream from the air valve and configured to initiate a detonation wave by igniting the mixed fuel-air region. In addition, the pulse detonation tube includes a local flexural wave modifying feature positioned downstream from the ignition source. The local flexural wave modifying feature is configured to locally vary a flexural wave speed such that the flexural wave speed through the pulse detonation tube is different than an expected speed of the detonation wave, and/or to locally dissipate flexural wave energy.

In a further embodiment, a pulse detonation tube includes a continuous base tube having a substantially uniform wall thickness. The continuous base tube is configured to facilitate propagation of a detonation wave through a downstream region of the continuous base tube. The pulse detonation tube also includes a local flexural wave modifying feature proximate to the downstream region. The local flexural wave modifying feature is configured to locally vary a flexural wave speed such that the flexural wave speed through the pulse detonation tube is different than an expected speed of the detonation wave, and/or to locally dissipate flexural wave energy.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As used herein, a pulse detonation tube is understood to mean any device or system that produces both a pressure rise and velocity increase from a series of repeated detonations or quasi-detonations within the tube. A "quasi-detonation" is a supersonic turbulent combustion process that produces a pressure rise and velocity increase higher than the pressure rise and velocity increase produced by a deflagration wave. Embodiments of pulse detonation tubes include a means of igniting a fuel/oxidizer mixture, for example a fuel/air mixture, and a detonation chamber, in which pressure wave fronts initiated by the ignition process coalesce to produce a detonation wave or quasi-detonation. Each detonation or quasi-detonation is initiated either by external ignition, such as spark discharge or laser pulse, or by gas dynamic processes, such as shock focusing, auto ignition or by another detonation (i.e. cross-fire). As used herein, detonation is used to mean either a detonation or quasi-detonation.

Embodiments disclosed herein may substantially reduce strain within a pulse detonation tube by locally varying flexural wave propagation through the tube such that a detonation wave does not excite the tube at a resonance frequency (e.g., the breathing mode resonance frequency). For example, in one embodiment, a pulse detonation tube includes a continuous base tube having a substantially uniform wall thickness. The continuous base tube is configured to facilitate propagation of a detonation wave through a downstream region of the continuous base tube. The pulse detonation tube also includes a local flexural wave modifying feature coupled to the continuous base tube proximate to the downstream region. The local flexural wave modifying feature is configured to locally vary a flexural wave speed of the pulse detonation tube such that the flexural wave speed is different than an expected speed of the detonation wave and/or to locally dissipate flexural wave energy. In this manner, interaction between the detonation wave and the flexural waves will not drive the pulse detonation tube at a resonance frequency, thereby substantially reducing strain within the tube. As a result, the longevity of the pulse detonation tube may be significantly enhanced, and/or the pulse detonation tube may be constructed from lighter and/or less expensive materials.

Figure 1:
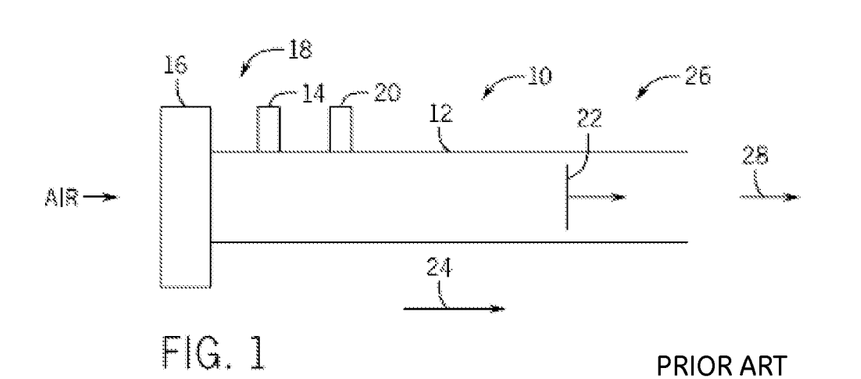
FIG. 1 is a schematic diagram of an embodiment of a pulse detonation tube.

FIG. 1 is a schematic diagram of an embodiment of a pulse detonation tube 10 that may be used to produce thrust and/or drive a turbine. In the present embodiment, the pulse detonation tube 10 includes a continuous base tube 12 having a substantially uniform wall thickness. The pulse detonation tube 10 also includes at least one fuel injector 14 (e.g., 1, 2, 3, 4, 5, 6, 7, 8, 9, 10, or more), which feeds fuel to a combustion zone located within the pulse detonation tube 10. Furthermore, the pulse detonation tube 10 includes an air valve 16 disposed to an upstream region 18 of the tube 10. The air valve 16 is configured to inject discrete air pulses into the pulse detonation tube 10. The fuel injector 14 is configured to inject fuel into each of the air pulses to establish a fuel-air mixture suitable for detonation. An ignition source 20 then detonates the fuel-air mixture, thereby forming a detonation wave 22 that propagates through the pulse detonation tube 10 in a downstream direction 24. Specifically, the detonation wave 22 passes through a downstream region 26 of the tube 10, e.g., a region downstream from the ignition source 20. Exhaust gas 28 from the detonation reaction exits the pulse detonation tube 10 in the downstream direction 24 and may be utilized to produce thrust or to drive a turbine, for example.

As discussed in detail below, the pulse detonation tube 10 includes a local flexural wave modifying feature coupled to the continuous base tube 12 proximate to the downstream region 26. The local flexural wave modifying feature is configured to locally vary a flexural wave speed of the pulse detonation tube 10 such that the flexural wave speed is different than an expected speed of the detonation wave 22 and/or to locally dissipate flexural wave energy. As will be appreciated, material properties and geometry of the pulse detonation tube 10 at least partially define a speed at which mechanical waves travel through the structure of the tube 10. This speed may be known as the flexural wave speed and may include a breathing mode component and a dilatation component. As the detonation wave 22 travels through the tube 10 in the downstream direction 24, the sharp pressure rise associated with the detonation wave front generates a mechanical wave at each discrete location along the length of the tube 10. These mechanical waves propagate through the tube structure at the flexural wave speed. If the speed of the detonation wave 22 is substantially similar to the flexural wave speed of the tube, the detonation wave 22 will excite the pulse detonation tube 10 at resonance. Consequently, the strain resulting from the detonation wave 22 will be significantly greater than the strain associated with static pressure loading at the detonation wave pressure. Such strain amplification may increase along the length of the tube 10 due to the additive effect of multiple coalescing flexural waves. For example, in certain tube configurations, the strain may be amplified by a factor of 2, 3, 4, 5, 6, or more compared to static pressure loading. Because the local flexural wave modifying feature is configured to locally vary a flexural wave speed of the pulse detonation tube 10 such that the flexural wave speed is different than the speed of the detonation wave 22 and/or to locally dissipate flexural wave energy, the detonation wave 22 will not drive the pulse detonation tube at a resonance frequency (e.g., the breathing mode resonance frequency), thereby substantially reducing strain within the tube structure. As a result, the longevity of the pulse detonation tube 10 may be significantly enhanced, and/or the pulse detonation tube may be constructed from lighter and/or less expensive materials.

As will be appreciated, the pulse detonation tube 10 may be employed within a pulse detonation combustor of a gas turbine engine. In such a configuration, the exhaust gas from the pulse detonation tube 10 may be utilized to drive a turbine to rotate. Alternatively, the pulse detonation tube 10 may be employed within a "pure" pulse detonation engine in which the exhaust is directed through a converging-diverging nozzle directly to ambient to produce raw thrust. Furthermore, while the present embodiments describe a combustion reaction involving fuel and air, it should be appreciated that alternative embodiments may react other oxidizers (e.g., oxygen, nitrous oxide, etc.) with the fuel to produce a combustion reaction.

Figure 2:
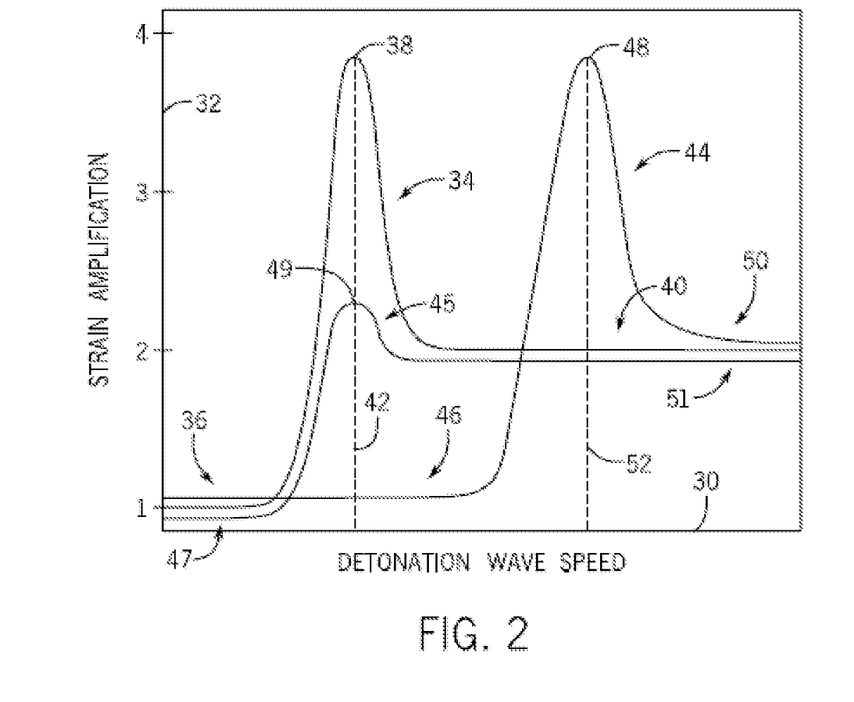
FIG. 2 is an exemplary graph of strain amplification versus detonation wave speed for a pulse detonation tube having a substantially uniform wall thickness and for a pulse detonation tube having a local flexural wave modifying feature.

FIG. 2 is an exemplary graph of strain amplification versus detonation wave speed for a pulse detonation tube having a substantially uniform wall thickness and for a pulse detonation tube having a local flexural wave modifying feature. As illustrated, a horizontal axis 30 represents detonation wave speed, a vertical axis 32 represents strain amplification, and a curve 34 represents strain amplification as a function of detonation wave speed at a discrete location along a pulse detonation tube having a substantially uniform wall thickness, such as the continuous base tube 12. Strain amplification may be defined as the ratio of strain induced by the detonation wave 22 to the expected strain associated with static pressure loading at the detonation wave pressure. As illustrated, the strain amplification curve 34 includes a subcritical region 36, a critical region 38 and a supercritical region 40. The strain amplification curve 34 reaches a maximum at the critical region 38 where the detonation wave speed is substantially equal to the flexural wave speed of the pulse detonation tube 10. This speed may be known as the critical wave speed 42. As illustrated, operating the pulse detonation tube 10 at the critical wave speed 42 may result in a strain amplification of approximately 4. However, it should be appreciated that the maximum strain amplification may be higher or lower in alternative tube configurations. For example, in certain embodiments, the maximum strain amplification may be greater than approximately 2, 3, 4, 5, 6, or more.

As illustrated, strain amplification decreases rapidly as detonation wave speed decreases below the critical wave speed 42. Consequently, the strain amplification within the subcritical region 36 may be approximately 1. However, it should be appreciated that the strain amplification within the subcritical region may be approximately, 1.2, 1.4. 1.6, 1.8, or more in alternative embodiments. Similarly, as the detonation wave speed increases above the critical wave speed 42, the strain amplification decreases to approximately 2, and remains substantially constant throughout the supercritical region 40. While the strain amplification is approximately 2 in the supercritical region 40 of the present embodiment, it should be appreciated that alternative tube configurations may produce a higher or lower amplification factor within the supercritical region 40. In addition, it should be appreciated that the strain amplification may begin to decrease toward zero as detonation wave speed increases beyond the supercritical region 40.

The graph also includes a curve 44 which represents strain amplification as a function of detonation wave speed at a discrete location along a pulse detonation tube 10 having a local flexural wave modifying feature. Similar to the curve 34, the curve 44 includes a subcritical region 46, a critical region 48 and a supercritical region 50. However, as indicated by the position of the critical region 48, the critical wave speed 52 of the pulse detonation tube having the local flexural wave modifying feature is significantly greater than the critical wave speed 42 of the tube having a substantially uniform wall thickness. In other words, mechanical waves may travel through the structure of the tube having the local flexural wave modifying feature faster than the tube having a substantially uniform wall thickness. As a result, if an expected detonation wave speed corresponds to the critical wave speed 42, the strain amplification within the tube having a substantially uniform wall thickness will be approximately 4. However, because the critical wave speed 42 falls within the subcritical region 46 of the tube having the local flexural wave modifying feature, the strain amplification will be approximately 1. Consequently, the longevity of the pulse detonation tube having the local flexural wave modifying feature may be significantly greater than the longevity of the tube having a substantially uniform wall thickness.

In addition, the graph includes another curve 45 which represents strain amplification as a function of detonation wave speed at a discrete location along a pulse detonation tube 10 having an alternative local flexural wave modifying feature. The curve 45 includes a subcritical region 47, a critical region 49 and a supercritical region 51 which substantially correspond to the detonation wave speeds associated with the respective regions of the curve 34. However, the strain amplification associated with the critical region 49 of the curve 45 is substantially lower than the strain amplification associated with the critical region 38 of the curve 34. Specifically, the pulse detonation tube associated with the curve 45 includes a local flexural wave modifying feature configured to locally dissipate flexural wave energy, thereby reducing the maximum strain amplification to approximately 2.25. For example, the local flexural wave modifying feature may interfere with the flexural waves propagating through the tube in the downstream direction, thereby substantially reducing or eliminating the possibility of establishing resonant coupling between the detonation wave and the tube. Consequently, even though the critical wave speed 42 of the curve 45 remains substantially similar to the critical wave speed of the curve 34, the strain amplification is substantially reduced, thereby resulting in extended longevity of the pulse detonation tube. While the maximum strain amplification of the curve 45 is approximately 2.25, it should be appreciated that alternative local flexural wave modifying features may produce higher or lower maximum strain amplifications.

As previously discussed, the graph represents strain amplification as a function of detonation wave speed at one discrete location along the length of the pulse detonation tube 10. As will be appreciated, strain amplification may increase along the length of the tube due to the additive effect of multiple coalescing flexural waves. Consequently, the strain within the downstream region 26 of the pulse detonation tube 10 may be significantly greater than the strain within the upstream region 18. As a result, the local flexural wave modifying feature may be coupled to the tube 10 proximate to the downstream region 26, thereby reducing strain and enabling the pulse detonation tube to be constructed from lighter and/or less expensive materials.

It should be appreciated that the flexural wave speed of a pulse detonation tube 10 may be at least partially dependent on the dimensions and/or material properties of the tube. For example, the flexural wave speed may be approximated by the following equation:

$$V = \frac{1}{d+t}\sqrt{\frac{E \cdot t \cdot d}{\rho(1-v^2)}}$$

where d is the diameter of the tube, t is the wall thickness of the tube, E is the Young's modulus of the tube material, ρ is the density of the tube material, and v is Poisson's ratio of the tube material. Because the Young's modulus, density and Poisson's ratio are material properties of the tube 10, locally varying these parameters would involve changing the composition or structure of the tube walls along the length of the tube 10. In addition, varying the diameter of the tube 10 may affect the flow properties (e.g., pressure, velocity, temperature, etc.) of the detonation wave 22. Consequently, it may be desirable to locally vary the thickness of the tube walls to adjust the flexural wave speed of the pulse detonation tube 10.

Figure 3:
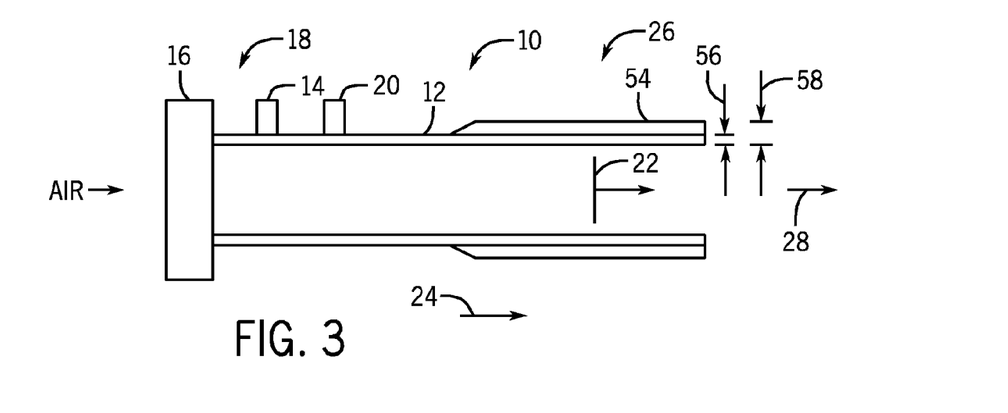
FIG. 3 is a schematic diagram of an embodiment of a pulse detonation tube having an outer tube coupled to a base tube.

FIG. 3 is a schematic diagram of an embodiment of a pulse detonation tube 10 having an outer tube 54 coupled to the continuous base tube 12. As previously discussed, the flexural wave speed is at least partially dependent on the tube wall thickness. Specifically, increasing the thickness of the tube walls increases the speed at which flexural waves travel through the pulse detonation tube 10. In the illustrated embodiment, the continuous base tube 12 has a substantially uniform wall thickness 56, thereby establishing a particular flexural wave speed. If the speed of the detonation wave 22 is substantially similar to the flexural wave speed, a resonance will be established within the pulse detonation tube 10 that significantly increases strain compared to static pressure loading at the detonation wave pressure. By locally increasing the thickness 58 of the pulse detonation tube 10 at the downstream region 26, the flexural wave speed will be increased such that the detonation wave 22 will not drive the tube 10 at a resonance frequency (e.g., the breathing mode resonance frequency), thereby substantially reducing strain within the pulse detonation tube 10.

By way of example, the detonation wave 22 may propagate through the pulse detonation tube at approximately 1700 m/s. If the flexural wave speed of the continuous base tube 12 is also approximately 1700 m/s, the detonation wave 22 will induce a resonance within the pulse detonation tube 10 that significantly increases strain compared to static pressure loading at the detonation wave pressure. Moreover, due to the additive effect of multiple coalescing flexural waves, strain may increase along the length of the tube 10. Consequently, by coupling an outer tube 54 to the continuous base tube 12 proximate to the downstream region 26, the thickness 58 of the pulse detonation tube 10 will be increased, thereby increasing flexural wave speed above the detonation wave speed. For example, the flexural wave speed may be increased to approximately 2000 m/s. As a result, the downstream portion 26 of the tube 10 will be in the subcritical region, thereby resulting in decreased strain and increased tube longevity.

While an outer tube 54 is coupled to the continuous base tube 12 in the present embodiment, it should be appreciated that alternative embodiments may employ a tube 12 having a wall thickness that increases along the downstream direction 24. Furthermore, it should be appreciated that wall thickness may be decreased within the downstream region 26, thereby enabling the pulse detonation tube 10 to operate within the supercritical region. While the strain within the supercritical region may be greater than the strain within the subcritical region, the strain is less than the strain within the critical region. In addition, the thinner tube walls may significantly decrease the weight and/or manufacturing costs of the pulse detonation tube 10.

Figure 4:
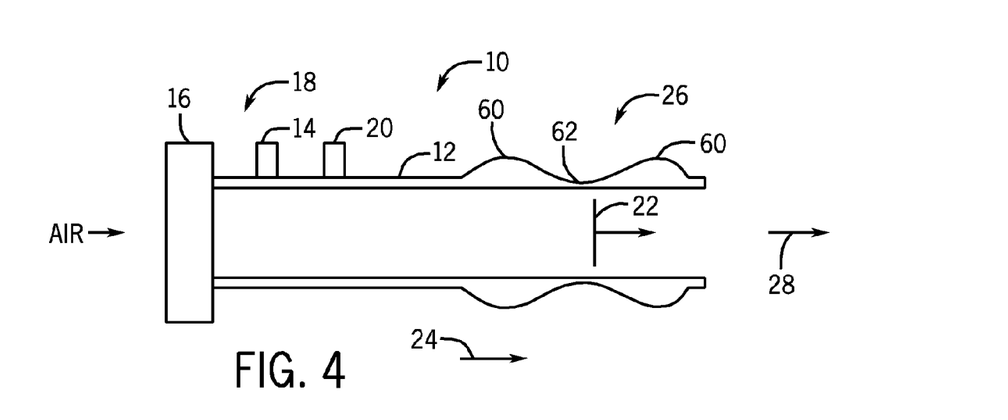
FIG. 4 is a schematic diagram of an embodiment of a pulse detonation tube having a wall thickness that periodically increases and decreases along a downstream direction.

FIG. 4 is a schematic diagram of an embodiment of a pulse detonation tube 10 having a wall thickness that periodically increases and decreases along a downstream direction 24. As illustrated, the pulse detonation tube 10 includes a wavy or undulating surfacing having crests 60 and troughs 62. As a result of this configuration, the flexural wave speed of the pulse detonation tube 10 will periodically increase and decrease based on the local tube wall thickness. Because the flexural wave speed varies throughout the downstream region 26 of the tube 10, the possibility of establishing resonant coupling between the detonation wave 22 and the tube 10 will be significantly reduced or eliminated. Consequently, strain within the tube 10 will be significantly lower than a tube having a substantially uniform wall thickness. While the present embodiment includes two crests 60 and one trough 62, it should be appreciated that alternative embodiments may include more or fewer crests 60 and/or troughs 62. In addition, it should be appreciated that the amplitude and/or frequency of the wavy surface may vary in alternative embodiments.

Figure 5:
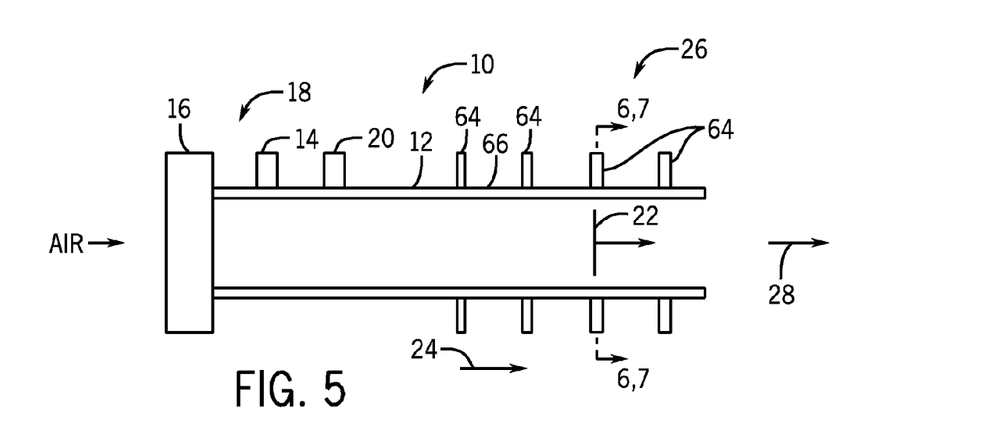
FIG. 5 is a schematic diagram of an embodiment of a pulse detonation tube having multiple rings disposed about a base tube and coupled to an exterior surface of the base tube.

FIG. 5 is a schematic diagram of an embodiment of a pulse detonation tube 10 having multiple rings 64 disposed about the continuous base tube 12 and coupled to an exterior surface 66 of the base tube 12 proximate to the downstream region 26. In the present embodiment, the rings 64 are configured to locally dissipate flexural wave energy. Specifically, the rings 64 will interfere with the flexural waves propagating through the tube 10 in the downstream direction 24, thereby substantially reducing or eliminating the possibility of establishing resonant coupling between the detonation wave 22 and the tube 10. In addition, the rings 64 may reflect flexural waves (e.g., in an opposite direction), thereby dissipating wave energy as the reflected waves interact with the incident flexural waves. Consequently, strain within the tube 10 will be significantly lower than a tube having no flexural wave modifying features. While four rings 64 are employed in the present embodiment, it should be appreciated that more or fewer rings 64 may be utilized in alternative embodiments. For example, in certain embodiments, 1, 2, 3, 4, 5, 6, 7, 8, 9, 10, or more rings 64 may be disposed about the continuous base tube 12 and coupled to the exterior surface 66.

Figure 6:
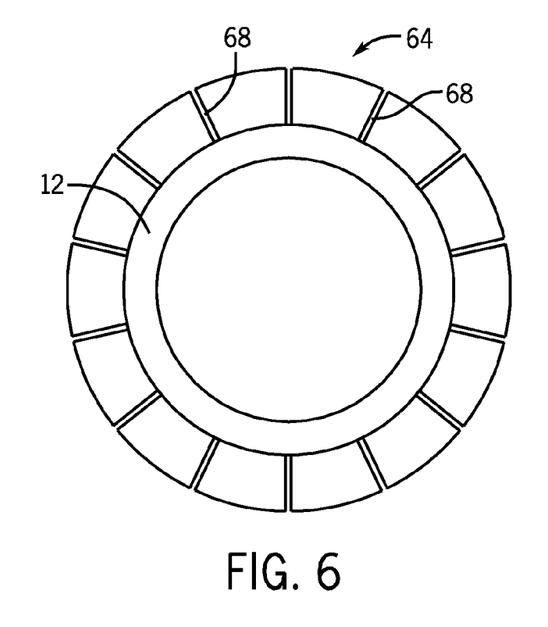
FIG. 6 is a cross-sectional view of the pulse detonation tube of FIG. 5, taken along line 6-6, showing a ring having multiple radial slits.

FIG. 6 is a cross-sectional view of the pulse detonation tube 10 of FIG. 5, taken along line 6-6, showing a ring 64 having multiple radial slits 68. As previously discussed, the rings 64 may dissipate flexural wave energy by interfering with flexural wave propagation through the pulse detonation tube 10. The slits 68 may enable cooling air to flow through the rings 64, thereby enhancing heat transfer between the pulse detonation tube 10 and the cooling air. For example, in certain embodiments, air may be directed along the length of the pulse detonation tube in an upstream direction before entering the tube 10 through the air valve 16. Alternatively, air may be directed along the tube 10 in a downstream direction and/or may impinge an exterior surface of the tube. As the air passes through the rings 64, heat will be transferred to the air, thereby cooling the tube 10. As a result, the tube 10 may be constructed from thinner and/or lighter material due to the enhanced heat dissipation.

Figure 7:
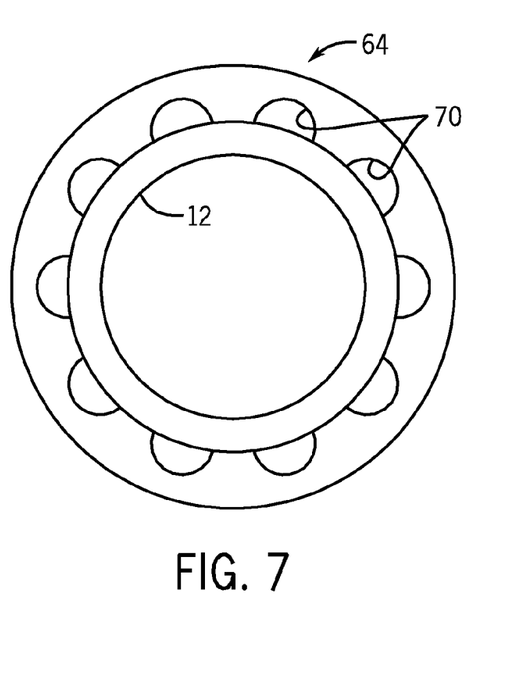
FIG. 7 is a cross-sectional view of the pulse detonation tube of FIG. 5, taken along line 7-7, showing a ring having multiple cavities.

FIG. 7 is a cross-sectional view of the pulse detonation tube 10 of FIG. 5, taken along line 7-7, showing a ring 64 having multiple cavities 70. Similar to the slit configuration, the cavities 70 may provide a path for cooling air to flow along the length of the tube 10. In further embodiments, the rings 64 may include other features to enhance heat transfer between the tube 10 and the cooling air, or the rings 64 may be substantially solid. In yet further embodiments, a single ring 64 may extend along the entire length of the downstream region 26. In such embodiments, the extended ring 64 may include slits 68, such as those described above with reference to FIG. 6, or cavities 70.

Figure 8:
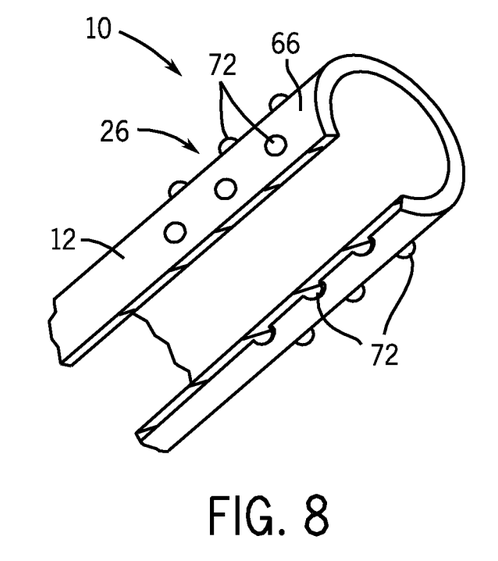
FIG. 8 is a cutaway perspective view of an embodiment of a pulse detonation tube having multiple nubs extending from an exterior surface of a base tube.

FIG. 8 is a cutaway perspective view of an embodiment of a pulse detonation tube 10 having multiple nubs 72 extending from the exterior surface 66 of the continuous base tube 12. The nubs 72 may be coupled to the exterior surface 66 and/or integral with the exterior surface 66. Similar to the rings 64, the nubs 72 are configured to locally dissipate flexural wave energy passing through the downstream region 26 of the pulse detonation tube 10. Specifically, the nubs 72 will interfere with the flexural waves propagating through the tube 10 in the downstream direction 24, thereby substantially reducing or eliminating the possibility of establishing resonant coupling between the detonation wave 22 and the tube 10. Consequently, strain within the tube 10 will be significantly lower than a tube having no flexural wave modifying features. While the nubs 72 are substantially hemispherical in the present embodiment, it should be appreciated that the nubs 72 may form other shapes in alternative embodiments. Furthermore, while three rows of nubs 72 are coupled to the continuous base tube 12 in the present embodiment, it should be appreciated that alternative embodiments may include more or fewer nubs 72. In addition, the nubs 72 may transfer heat from the pulse detonation tube to an air flow adjacent to the pulse detonation tube 10, thereby providing additional cooling.

Figure 9:
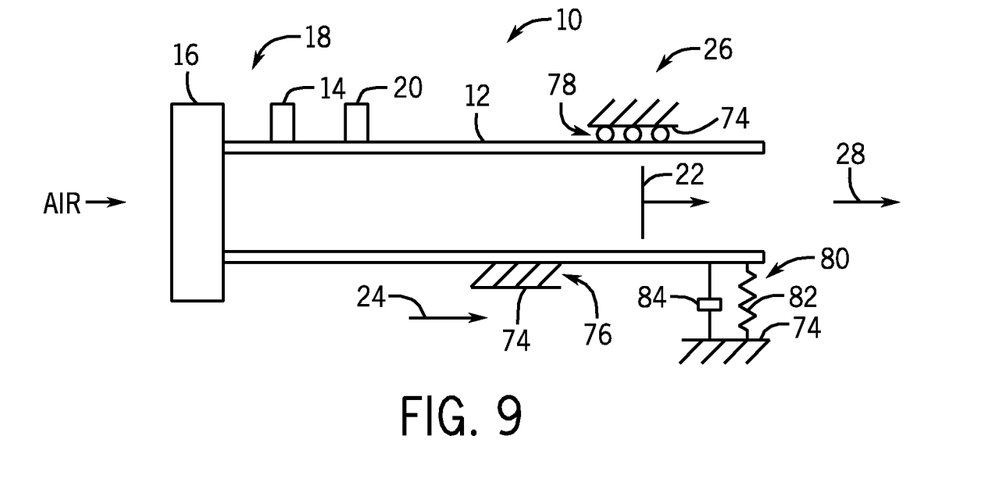
FIG. 9 is a schematic diagram of an embodiment of a pulse detonation tube having multiple couplings to a support structure.

FIG. 9 is a schematic diagram of an embodiment of a pulse detonation tube 10 having multiple couplings to a support structure 74. As will be appreciated, multiple pulse detonation tubes 10 may be supported within a pulse detonation combustor system. In such a configuration, each tube 10 may be secured to a common support structure that transfers loads from the tubes 10 to a body of the combustor system. In certain embodiments, the couplings between the tubes 10 and the support structure 74 may serve to locally dissipate flexural wave energy. For example, the couplings between the continuous base tube 12 and the tube support structure 74 may include a fixed coupling 76. As will be appreciated, the fixed coupling 76 substantially blocks movement of the continuous base tube 12 relative to the support structure 74. In addition, the fixed coupling 76 may transfer flexural wave energy from the pulse detonation tube 10 to the support structure 74, thereby interfering with the mechanical waves propagating through the tube 10 in the downstream direction 24 and substantially reducing or eliminating the possibility of establishing resonant coupling between the detonation wave 22 and the tube 10.

In addition to the fixed coupling 76, the pulse detonation tube 10 may employ a roller coupling 78 to secure the continuous base tube 12 to the support structure 74. The roller coupling 78 substantially blocks lateral movement of the tube 10 relative to the support structure 74, while facilitating longitudinal expansion and contraction of the tube 12. Similar to the fixed coupling 76, the roller coupling 78 may transfer a portion of the flexural wave energy to the support structure 74, thereby interfering with the resonant coupling between the detonation wave 22 and the pulse detonation tube 10. The illustrated embodiment also includes a damped coupling 80 configured to damp movement of the continuous base tube 12 relative to the support structure 74. As illustrated, the damped coupling 80 includes a spring 82 and a dashpot 84. Because the damped coupling 80 is configured to absorb vibrational energy, the coupling 80 may interfere with the resonant coupling between the denotation wave 22 and the pulse detonation tube 10 by dissipating flexural wave energy. Consequently, strain within the tube 10 may be significantly lower than a tube having no damping feature.

While the illustrated embodiment includes a single fixed coupling 76, a single roller coupling 78 and a single damped coupling 80, it should be appreciated that alternative embodiments may include other couplings secured to the downstream region 26 of the continuous base tube 12. For example, certain embodiments may include a single fixed coupling 76, roller coupling 78 or damped coupling 80 secured to a downstream end of the tube 10. Alternatively, the pulse detonation tube may include multiple couplings, of the same type or of different types, secured to various positions along the length of the continuous base tube 12.

Figure 10:
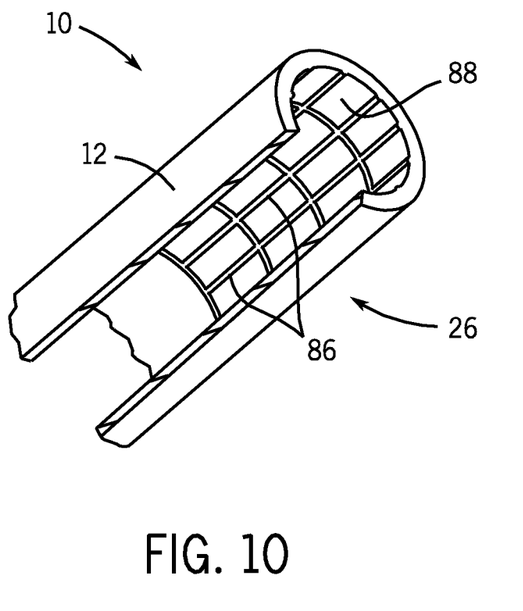
FIG. 10 is a cross-sectional view of an embodiment of a pulse detonation tube having multiple ridges disposed on an interior surface of a base tube.

FIG. 10 is a cross-sectional view of an embodiment of a pulse detonation tube 10 having multiple ridges 86 disposed on an interior surface 88 of the continuous base tube 12 proximate to the downstream region 26. Similar to the rings 64 and nubs 72 coupled to the exterior surface 66 of the continuous base tube 12, the ridges 86 are configured to locally dissipate flexural wave energy. Specifically, the ridges 86 will interfere with the flexural waves propagating through the tube 10 in the downstream direction 24, thereby substantially reducing or eliminating the possibility of establishing resonant coupling between the detonation wave 22 and the tube 10. Consequently, strain within the tube 10 will be significantly lower than a tube having a substantially smooth interior surface. In the present embodiment, the ridges 86 are integral with the continuous base tube 12. However, it should be appreciated that alternative embodiments may include ridges coupled to the interior 88 of the continuous base tube 12. In addition, the number, orientation, height and/or shape of the ridges may vary in alternative embodiments to achieve a desired degree of flexural wave dissipation.

Certain pulse detonation tubes 10 include internal features configured to accelerate the flow through the tube 10, thereby inducing a deflagration to detonation transition (DDT). In certain embodiments, the ridges 86 may be configured to locally dissipate flexural wave energy in addition to accelerating the flow to induce DDT. In such embodiments, the ridges 86 may extend into the upstream region 18 to facilitate DDT.

While a variety of internal and external local flexural wave modifying features have been described above, it should be appreciated that alternative embodiments may include other features configured to vary flexural wave speed and/or dissipate flexural wave energy. For example, certain embodiments may include local flexural wave modifying features that extend about the interior surface or the exterior surface of the tube in a spiral pattern. Yet further embodiments may include features that extend along the axial direction or the radial direction of the tube. It should also be appreciated that each flexural wave modifying feature may be integral with the continuous base tube or coupled to the continuous base tube.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A pulse detonation tube comprising:
   a continuous base tube having an interior surface, an exterior surface and a substantially uniform wall thickness; and
   a local flexural wave modifying feature configured on a downstream portion of the continuous base tube, the local flexural wave modifying feature comprising one of:
   at least one sinusoidal crest and at least one sinusoidal trough configured on an exterior surface of the continuous base tube to form an undulating exterior surface and a planar interior surface, such that a first local thickness at the at least one crest is greater than the uniform wall thickness and a second local thickness at the at least one trough is less than the uniform wall thickness,
   one or more couplings configured to couple an exterior surface of the continuous base tube to a tube support structure, wherein the one or more couplings comprise at least one of a roller coupling or a damped coupling comprising a spring and a dashpot, or
   a plurality of ridges disposed on an interior surface of the continuous base tube to form a ridged interior surface and a planar exterior surface,
   wherein the local flexural wave modifying feature is configured to locally vary a flexural wave speed such that the flexural wave speed through the pulse detonation tube is different than an expected detonation wave speed, to locally dissipate flexural wave energy, or a combination thereof.

2. The pulse detonation tube of claim 1, wherein the local flexural wave modifying feature defines a local variation in wall thickness of the continuous base tube.

3. The pulse detonation tube of claim 2, wherein the local variation in wall thickness periodically increases and decreases along a downstream direction.

4. A pulse detonation tube comprising:
   a continuous base tube having an interior surface, an exterior surface and a substantially uniform wall thickness;
   an air valve disposed at an upstream end of the pulse detonation tube and configured to emanate an air pulse in a downstream direction;
   a fuel injector configured to inject fuel into each air pulse to establish a mixed fuel-air region;
   an ignition source disposed downstream from the air valve and configured to initiate a detonation wave by igniting the mixed fuel-air region; and
   a local flexural wave modifying feature positioned downstream from the ignition source, the local flexural wave modifying feature comprising one of:
   at least one sinusoidal crest and at least one sinusoidal trough configured on an exterior surface of the continuous base tube to form an undulating exterior surface and a planar interior surface, such that a first local thickness at the at least one crest is reater than the uniform wall thickness and a second local thickness at the at least one trough is less than the uniform wall thickness,
   one or more couplings configured to couple the continuous base tube to a tube support structure, wherein the one or more couplings comprise at least one of a roller coupling or a damped coupling comprising a spring and a dashpot, or
   a plurality of ridges disposed on an interior surface of the continuous base tube to form a ridged interior surface and a planar exterior surface,
   wherein the local flexural wave modifying feature is configured to locally vary a flexural wave speed such that the flexural wave speed through the pulse detonation tube is different than an expected speed of the detonation wave, to locally dissipate flexural wave energy, or a combination thereof.

5. The pulse detonation tube of claim 4, wherein the local flexural wave modifying feature defines a local variation in wall thickness of the continuous base tube.

6. A pulse detonation tube comprising:
   a continuous base tube having an interior surface, an exterior surface and a substantially uniform wall thickness, wherein the continuous base tube is configured to facilitate propagation of a detonation wave through a downstream region of the continuous base tube; and
   a local flexural wave modifying feature proximate to the downstream region, wherein the local flexural wave modifying feature comprising one of:
   at least one sinusoidal crest and at least one sinusoidal trough configured on an exterior surface of the continuous base tube to form an undulating exterior surface and a planar interior surface, such that a first local thickness at the at least one crest is greater than the uniform wall thickness and a second local thickness at the at least one trough is less than the uniform wall thickness,
   one or more couplings configured to couple the continuous base tube to a tube support structure, wherein the one or more couplings comprise at least one of a roller coupling or a damped coupling comprising a spring and a dashpot, or
   a plurality of ridges disposed on an interior surface of the continuous base tube to form a ridged interior surface and a planar exterior surface,
   wherein the local flexural wave modifying feature is configured to locally vary a flexural wave speed such that the flexural wave speed through the pulse detonation tube is different than an expected speed of the detonation wave, to locally dissipate flexural wave energy, or a combination thereof.

7. The pulse detonation tube of claim 6, wherein the local flexural wave modifying feature defines a local variation in wall thickness of the continuous base tube.

8. The pulse detonation tube of claim 6, wherein the plurality of ridges are configured to induce a deflagration to detonation transition.

* * * * *